(12) United States Patent
Zhang et al.

(10) Patent No.: US 9,142,210 B2
(45) Date of Patent: Sep. 22, 2015

(54) METHOD AND DEVICE FOR SPEAKER RECOGNITION

(71) Applicant: Huawei Technologies Co., Ltd., Shenzhen (CN)

(72) Inventors: Xiang Zhang, Shenzhen (CN); Hualin Wan, Beijing (CN); Jun Zhang, Beijing (CN); Li Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 14/145,318

(22) Filed: Dec. 31, 2013

(65) Prior Publication Data

US 2014/0114660 A1 Apr. 24, 2014

Related U.S. Application Data

(63) Continuation of application No. PCT/CN2011/084121, filed on Dec. 16, 2011.

(51) Int. Cl.
*G10L 17/00* (2013.01)
*G10L 17/02* (2013.01)
*G10L 17/06* (2013.01)
*G10L 15/14* (2006.01)
*G10L 17/10* (2013.01)
*G10L 17/04* (2013.01)
*G10L 17/08* (2013.01)

(52) U.S. Cl.
CPC .................. *G10L 15/14* (2013.01); *G10L 17/00* (2013.01); *G10L 17/06* (2013.01); *G10L 17/04* (2013.01); *G10L 17/08* (2013.01); *G10L 17/10* (2013.01)

(58) Field of Classification Search
CPC ......... G10L 17/04; G10L 17/00; G10L 17/06; G10L 17/08; G10L 17/10
USPC .................................................. 704/246–250
See application file for complete search history.

(56) References Cited

U.S. PATENT DOCUMENTS

| | | | |
|---|---|---|---|
| 2008/0010065 A1* | 1/2008 | Bratt et al. | 704/246 |
| 2008/0208581 A1* | 8/2008 | Pelecanos et al. | 704/250 |
| 2014/0114660 A1* | 4/2014 | Zhang et al. | 704/240 |

FOREIGN PATENT DOCUMENTS

| | | |
|---|---|---|
| CN | 101833951 A | 9/2010 |
| CN | 102034472 A | 4/2011 |
| WO | 2004112001 A1 | 12/2004 |

OTHER PUBLICATIONS

Liu et al., "Improved GMM-UBM/SVM for Speaker Verification", Acoustics, Speech and Signal Processing, 2006. ICASSP 2006 Proceedings. 2006 IEEE International Conference on, vol. 1, No., pp. I,I, May 14-19, 2006.*

(Continued)

*Primary Examiner* — Samuel G Neway
(74) *Attorney, Agent, or Firm* — Conley Rose, P.C.; Grant Rodolph; Adam J. Stegge

(57) ABSTRACT

A method and device for speaker recognition are provided. In the present invention, identifiability re-estimation is performed on a first vector (namely, a weight vector) in a score function by adopting a support vector machine (SVM), so that a recognition result of a characteristic parameter of a test voice is more accurate, thereby improving identifiability of speaker recognition.

18 Claims, 2 Drawing Sheets

(56) References Cited

OTHER PUBLICATIONS

Campbell et al., "Support vector machines using GMM supervectors for speaker verification," Signal Processing Letters, IEEE, vol. 13, No. 5, pp. 308,311, May 2006.*

Chen, L., et al., "Studies on Speaker Recognition based on SVM and GMM," vol. 37, No. 14, Jul. 2011, 66 pages.

Foreign Communication From a Counterpart Application, PCT Application No. PCT/CN2011/084121, English Translation of the International Search Report dated Sep. 20, 2012, 2 pages.

Foreign Communication From a Counterpart Application, PCT Application No. PCT/CN2011/084121, English Translation of the Written Opinion dated Sep. 20, 2012, 6 pages.

* cited by examiner

METHOD AND DEVICE FOR SPEAKER RECOGNITION

CROSS-REFERENCE TO RELATED APPLICATION

This application is a continuation of PCT/CN2011/084121, filed on Dec. 16, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to speaker recognition technologies, and in particular, to a method and device for speaker recognition.

BACKGROUND

Voiceprint recognition technologies are also called speaker recognition technologies, and are technologies that distinguish speakers according to voices and are used for identifying identities of the speakers. Generally speaking, speaker recognition technologies mainly include target speaker model registration and score measurement, so as to obtain a recognition result according to an obtained score. For example, in a Gaussian Mixture Model (GMM)-Universal Background Model (UBM)-based system, first, a UBM and a GMM of a target speaker are used to obtain a score function of a characteristic parameter of a test voice based on a log-likelihood ratio; then, the characteristic parameter of the test voice is taken as an input of the score function to obtain a corresponding speaker score; if the score is higher than a preset threshold value, a recognition result is true; if the score is lower than the preset threshold value, the recognition result is false.

However, the method for speaker recognition in the prior art has low identifiability.

SUMMARY

Embodiments of the present invention provide a method and device for speaker recognition, which are used to improve identifiability.

In one aspect, a method for speaker recognition is provided and includes: obtaining, by using a characteristic parameter of a test voice, a first GMM, and a second GMM, a first score function of the characteristic parameter of the test voice, where the first score function is a difference between a logarithm of a first likelihood probability of the characteristic parameter of the test voice on the first GMM and a logarithm of a second likelihood probability of the characteristic parameter of the test voice on the second GMM; obtaining, by using the characteristic parameter of the test voice and a third GMM, a third likelihood probability of the characteristic parameter of the test voice on the third GMM, where the third GMM is composed of the first GMM and the second GMM; obtaining a second score function of the characteristic parameter of the test voice according to the first score function and the third likelihood probability, where the second score function is equal to an inner product of a first vector and a second vector, the first vector is a vector whose elements are all 1, and the second vector is a vector of a difference between an average posterior probability of the characteristic parameter of the test voice on the first GMM and an average posterior probability of the characteristic parameter of the test voice on the second GMM; and re-estimating, by using the second vector of a training recognition trial and through a support vector machine (SVM), the first vector to obtain a third vector and obtain a third score function of the characteristic parameter of the test voice, so as to take the characteristic parameter of the test voice as an input to obtain a corresponding speaker score, where the third score function is equal to an inner product of the third vector and the second vector.

In another aspect, a device for speaker recognition is provided and includes: a first obtaining unit configured to obtain, by using a characteristic parameter of a test voice, a first GMM, and a second GMM, a first score function of the characteristic parameter of the test voice, where the first score function is a difference between a logarithm of a first likelihood probability of the characteristic parameter of the test voice on the first GMM and a logarithm of a second likelihood probability of the characteristic parameter of the test voice on the second GMM; a second obtaining unit configured to obtain, by using the characteristic parameter of the test voice and a third GMM, a third likelihood probability of the characteristic parameter of the test voice on the third GMM, where the third GMM is composed of the first GMM and the second GMM; a third obtaining unit configured to obtain a second score function of the characteristic parameter of the test voice according to the first score function and the third likelihood probability, where the second score function is equal to an inner product of a first vector and a second vector, the first vector is a vector whose elements are all 1, and the second vector is a vector of a difference between an average posterior probability of the characteristic parameter of the test voice on the first GMM and an average posterior probability of the characteristic parameter of the test voice on the second GMM; and a fourth obtaining unit configured to re-estimate, by using the second vector of a training recognition trial and through an SVM, the first vector to obtain a third vector and obtain a third score function of the characteristic parameter of the test voice, so as to take the characteristic parameter of the test voice as an input to obtain a corresponding speaker score, where the third score function is equal to an inner product of the third vector and the second vector.

In another aspect, a device for speaker recognition is provided and includes: a memory for storing computer executable instructions; a processor configured to execute the computer executable instructions to: obtain, by using a characteristic parameter of a test voice, a first GMM and a second GMM, a first score function of the characteristic parameter of the test voice, wherein the first score function is a logarithm of a first likelihood probability of the characteristic parameter of the test voice on the first GMM and a logarithm of a second likelihood probability of the characteristic parameter of the test voice on the second GMM; obtain, by using the characteristic parameter of the test voice and a third GMM, a third likelihood probability of the characteristic parameter of the test voice on the third GMM, wherein the third GMM is composed of the first GMM and the second GMM; obtain a second score function of the characteristic parameter of the test voice according to the first score function and the third likelihood probability, wherein the second score function is equal to an inner product of a first vector and a second vector, the first vector is a vector whose elements are all 1, and the second vector is a vector of a difference between an average posterior probability of the characteristic parameter of the test voice on the first GMM and an average posterior probability of the characteristic parameter of the test voice on the second GMM; and re-estimate, by using the second vector of a training recognition trial and through an SVM, the first vector to obtain a third vector and obtain a third score function of the characteristic parameter of the test voice, so as to take the characteristic parameter of the test voice as an input to obtain a corresponding speaker score, wherein the third score function is equal to an inner product of the third vector and the second vector.

It may be known from the foregoing technical solutions that, in the embodiments of the present invention, identifiability re-estimation is performed on a first vector (namely, a weight vector) in a score function by adopting an SVM, so that a recognition result of a characteristic parameter of a test voice is more accurate, thereby improving identifiability of speaker recognition.

BRIEF DESCRIPTION OF THE DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
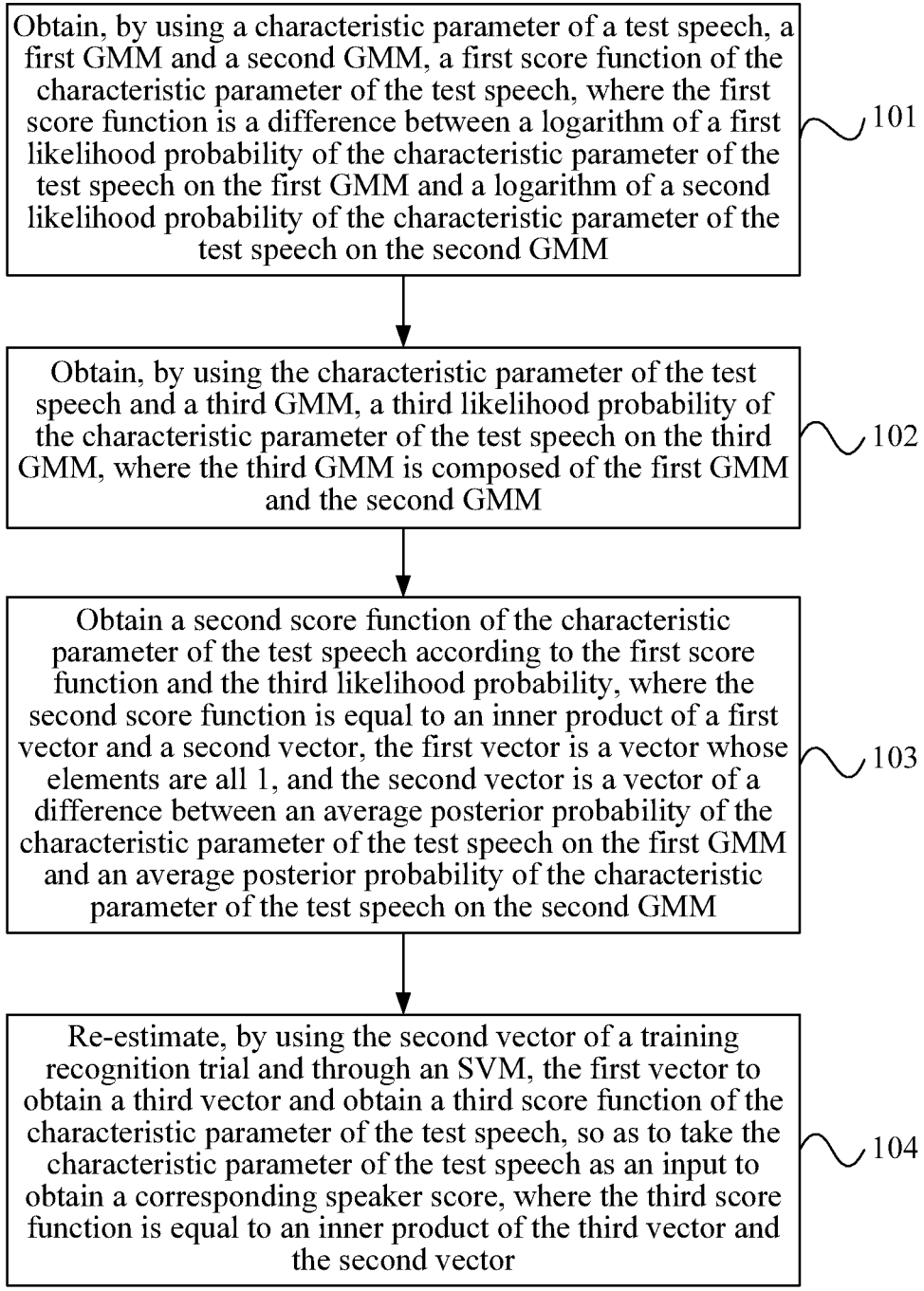
FIG. 1 is a schematic flow chart of a method for speaker recognition according to an embodiment of the present invention.

FIG. 1 is a schematic flow chart of a method for speaker recognition according to an embodiment of the present invention. As shown in FIG. 1, the method for speaker recognition according to this embodiment may include the following steps.

101: Obtain, by using a characteristic parameter of a test voice, a first GMM, and a second GMM, a first score function of the characteristic parameter of the test voice, where the first score function is a difference between a logarithm of a first likelihood probability of the characteristic parameter of the test voice on the first GMM and a logarithm of a second likelihood probability of the characteristic parameter of the test voice on the second GMM.

A characteristic parameter of a test voice (namely, each person) is different from that of another person, and is unique and hard to falsify and fake.

102: Obtain, by using the characteristic parameter of the test voice and a third GMM, a third likelihood probability of the characteristic parameter of the test voice on the third GMM, where the third GMM is composed of the first GMM and the second GMM.

103: Obtain a second score function of the characteristic parameter of the test voice according to the first score function and the third likelihood probability, where the second score function is equal to an inner product of a first vector and a second vector, the first vector (namely, a weight vector) is a vector whose elements are all 1, and the second vector is a vector of a difference between an average posterior probability of the characteristic parameter of the test voice on the first GMM and an average posterior probability of the characteristic parameter of the test voice on the second GMM.

104: Re-estimate, by using the second vector of a training recognition trial and through an SVM, the first vector to obtain a third vector and obtain a third score function of the characteristic parameter of the test voice, so as to take the characteristic parameter of the test voice as an input to obtain a corresponding speaker score, where the third score function is equal to an inner product of the third vector and the second vector.

In an application scenario of this embodiment, the first GMM may be a GMM of a target speaker, and the second GMM may be a UBM; or the first GMM may be a UBM, and the second GMM may be a GMM of a target speaker. First, a first score function of the characteristic parameter of the test voice may be obtained by using a characteristic parameter of a test voice, a UBM and a GMM of a target speaker, where the first score function is a difference between a logarithm of a first likelihood probability of the characteristic parameter of the test voice on the GMM of the target speaker and a logarithm of a second likelihood probability of the characteristic parameter of the test voice on the UBM, namely:

$$\text{Score} = \frac{1}{T}\sum_{t=1}^{T}(\log\, p(o_t|s) - \log\, p(o_t|m)), \quad (1)$$

where $o_t$ is a characteristic parameter of a test voice; T is a total number of characteristic parameters of test voices, s is a GMM of a target speaker, $p(o_t|s)$ is a likelihood probability of the characteristic parameter of the test voice on the GMM of the target speaker, m is a UBM, and $p(o_t|m)$ is a likelihood probability of the characteristic parameter of the test voice on the UBM.

Then, by using the characteristic parameter of the test voice, and the combined GMM of the target speaker composed of the UBM and the GMM of the target speaker, a third likelihood probability of the characteristic parameter of the test voice on the combined GMM of the target speaker may be obtained, namely:

$$p(o_t|\mu) = p(o_t|s)p(s) + p(o_t|m)p(m), \quad (2)$$

where $p(o_t|\mu)$ is a likelihood probability of a characteristic parameter of a test voice on a combined GMM of a target speaker.

For a recognition trial composed of a characteristic parameter of a test voice and a target speaker model, a larger obtained score indicates a larger probability of the fact that a recognition result is determined as true; otherwise, a smaller obtained score indicates a larger probability of the fact that a recognition result is determined as false. In the case that there is no prior knowledge, a probability of the fact that a recognition result is determined as true and a probability of the fact that a recognition result is determined as false are the same, and therefore, p(s)=p(m)=0.5.

Then, formula (2) is substituted into formula (1) to obtain:

$$\text{Score} = \frac{1}{T}\sum_{t=1}^{T}\left(\log\frac{p(o_t|s)}{p(o_t|\mu)} - \log\frac{p(o_t|m)}{p(o_t|\mu)}\right) = \quad (3)$$

$$\frac{1}{T}\sum_{t=1}^{T}\left(\log\frac{p(o_t|s)}{p(o_t|s)p(s) + p(o_t|m)p(m)} - \log\frac{p(o_t|m)}{p(o_t|s)p(s) + p(o_t|m)p(m)}\right).$$

Second-order Taylor series expansion of formula (3) is performed, namely, an approximation is performed with log x=x−1, a constant term that does not affect a recognition result is discarded, and then formula (3) may be simplified as:

$$\text{Score} = \sum_{c=1}^{C}\frac{1}{T}\sum_{t=1}^{T}\frac{p(o_t|s) - p(o_t|m_c)}{\sum_{j=1}^{C}p(o_t|s) + p(o_t|m_j)} = w^t b(\eta), \quad (4)$$

where formula (4) may be expressed as an inner product of $w^t$ and $b(\eta)$, where $w^t$ is a vector whose elements are all 1, namely: $w^t=[1, \ldots, 1]^t$; $b(\eta)$ is a vector of a difference between an average posterior probability of the characteristic parameter of the test voice on the UBM and an average posterior probability of the characteristic parameter of the test voice on the GMM of the target speaker, and may be called a recognition trial information vector, namely: $b(\eta)=[\phi_1, \ldots, \phi_c]^t$, $$\text{where } \phi_c = \frac{1}{T}\sum_{t=1}^{T}\frac{p(o_t|s) - p(o_t|m_c)}{\sum_{j=1}^{C}p(o_t|s) + p(o_t|m_j)}. \quad (5)$$

Actually, $w^t=[1, \ldots, 1]^t$ may be considered as a weight vector, and as weights corresponding to the weight vector for Gaussian components in a GMM of a target speaker and a UBM are the same, identifiability of a recognition result may be affected. Therefore, the weight vector, namely $w^t$, may be re-estimated in the following manner to improve identifiability.

First, a training set is hypothesized to train the weight vector, where a training recognition trial (namely, a recognition trial composed of a characteristic parameter of a test voice and a target speaker model) whose recognition result is determined as true is $\{x_i\}$, i=1, \ldots, $N_1$; a training recognition trial (namely, a recognition trial composed of a characteristic parameter of a test voice and a target speaker model) whose recognition result is determined as false is $\{y_i\}$, i=1, \ldots, $N_2$, and then recognition trial information vectors of the training recognition trials are $b(x_i)$ and $b(y_i)$.

Then, by using the recognition trial information vectors of the training recognition trials, namely, $b(x_i)$ and $b(y_i)$ and through an SVM, a re-estimated weight vector is obtained, namely:

$$w^t = \left(\sum_{i=1}^{l}\partial_i z_i v_i + D\right)^t, \quad (6)$$

where l is the number of support vectors; $\partial_i$ is −1 or +1, which is determined by a type of a training recognition trial; $z_i$ is a weight of a support vector; $v_i$ is a support vector, and D=[d, 0, \ldots, 0]$^t$.

The SVM may adopt a linear kernel function, a generalized linear discriminant sequence (GLDS) kernel function, or the like.

Finally, formula (6) is substituted into formula (4) to obtain:

$$\text{Score} = \sum_{c=1}^{C}\frac{1}{T}\sum_{t=1}^{T}\frac{p(o_t|s) - p(o_t|m_c)}{\sum_{j=1}^{C}p(o_t|s) + p(o_t|m_j)} = \quad (7)$$

$$\left(\sum_{i=1}^{l}\partial_i z_i v_i + D\right)^t b(\eta) = \left(\sum_{i=1}^{l}\partial_i z_i v_i\right)^t b(\eta) + d.$$

So far, the characteristic parameter of the test voice may be taken as an input to obtain a corresponding speaker score, so that a recognition result (true or false) can be obtained according to the obtained score.

In this embodiment, identifiability re-estimation is performed on a first vector (namely, a weight vector) in a score function by adopting an SVM, so that a recognition result of a characteristic parameter of a test voice is more accurate, thereby improving identifiability of speaker recognition.

It should be noted that, as for the foregoing method embodiment, for simple description, the method is described as a series of action combination, but persons skilled in the art should know that, the present invention is not limited by the described action sequence, because according to the present invention, some steps may be performed in other orders or performed simultaneously. Next, persons skilled in the art should also know that, the embodiments described in the specification are exemplary embodiments, and involved actions and modules are not indispensable for the present invention.

Figure 2:
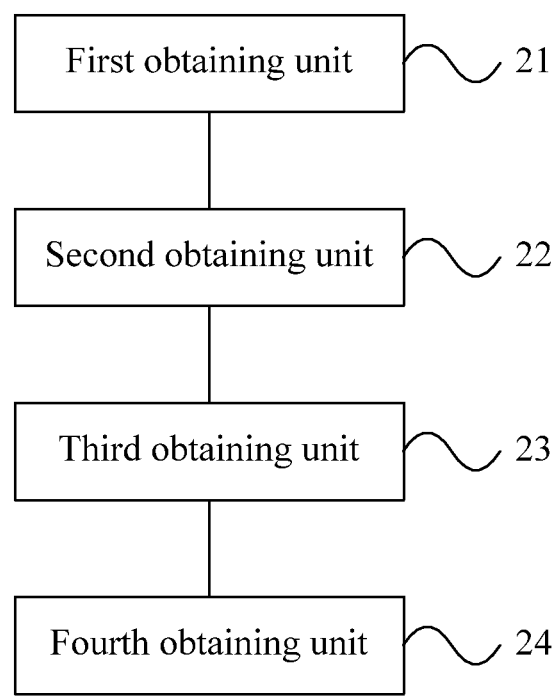
FIG. 2 is a schematic structural diagram of a device for speaker recognition according to another embodiment of the present invention.

FIG. 2 is a schematic structural diagram of a device for speaker recognition according to another embodiment of the present invention. As shown in FIG. 2, the device for speaker recognition in this embodiment may include a first obtaining unit 21, a second obtaining unit 22, a third obtaining unit 23, and a fourth obtaining unit 24. The first obtaining unit 21 is configured to obtain, by using a characteristic parameter of a test voice, a first GMM, and a second GMM, a first score function of the characteristic parameter of the test voice, where the first score function is a difference between a logarithm of a first likelihood probability of the characteristic parameter of the test voice on the first GMM and a logarithm of a second likelihood probability of the characteristic parameter of the test voice on the second GMM; the second obtaining unit 22 is configured to obtain, by using the characteristic parameter of the test voice and a third GMM, a third likelihood probability of the characteristic parameter of the test voice on the third GMM, where the third GMM is composed of the first GMM and the second GMM; the third obtaining unit 23 is configured to obtain a second score function of the characteristic parameter of the test voice according to the first score function and the third likelihood probability, where the second score function is equal to an inner product of a first vector and a second vector, the first vector is a vector whose elements are all 1, and the second vector is a vector of a difference between an average posterior probability of the characteristic parameter of the test voice on the first GMM and an average posterior probability of the characteristic parameter of the test voice on the second GMM; and the fourth obtaining unit 24 is configured to re-estimate, by using the second vector of a training recognition trial and through an SVM, the first vector to obtain a third vector and obtain a third score function of the characteristic parameter of the test voice, so as to take the characteristic parameter of the test voice as an input to obtain a corresponding speaker score, where the third score function is equal to an inner product of the third vector and the second vector.

The foregoing method according to the embodiment corresponding to FIG. 1 may be implemented by the device for speaker recognition provided in this embodiment.

In an application scenario of this embodiment, the first GMM may be a GMM of a target speaker, and the second GMM may be a UBM; or the first GMM may be a UBM, and the second GMM may be a GMM of a target speaker.

For example, the first obtaining unit 21 in this embodiment may be specifically configured to: obtain, by using a characteristic parameter of a test voice, a UBM and a GMM of a target speaker, formula (1) of a first score function of the characteristic parameter of the test voice, namely:

$$\text{Score} = \frac{1}{T} \sum_{t=1}^{T} (\log p(o_t|s) - \log p(o_t|m)), \quad (1)$$

where $o_t$ is a characteristic parameter of a test voice; T is a total number of characteristic parameters of test voices; s is a GMM of a target speaker; $p(o_t|s)$ is a likelihood probability of the characteristic parameter of the test voice on the GMM of the target speaker; m is a UBM; and $p(o_t|m)$ is a likelihood probability of the characteristic parameter of the test voice on the UBM.

For example, the second obtaining unit 22 in this embodiment may be specifically configured to: obtain, by using the characteristic parameter of the test voice, and a combined GMM of the target speaker composed of the UBM and the GMM of the target speaker, a likelihood probability of the characteristic parameter of the test voice on the combined GMM of the target speaker, namely:

$$p(o_t|\mu) = p(o_t|s)p(s) + p(o_t|m)p(m), \quad (2)$$

where $p(o_t|\mu)$ is a likelihood probability of a characteristic parameter of a test voice on a combined GMM of a target speaker.

For example, the third obtaining unit 23 in this embodiment may be specifically configured to: substitute $p(s)=p(m)=0.5$ and formula (2) into formula (1) to obtain formula (3), namely:

$$\text{Score} = \frac{1}{T}\sum_{t=1}^{T}\left(\log\frac{p(o_t|s)}{p(o_t|\mu)} - \log\frac{p(o_t|m)}{p(o_t|\mu)}\right) = \quad (3)$$

$$\frac{1}{T}\sum_{t=1}^{T}\left(\log\frac{p(o_t|s)}{p(o_t|s)p(s)+p(o_t|m)p(m)} - \right.$$

$$\left.\log\frac{p(o_t|m)}{p(o_t|s)p(s)+p(o_t|m)p(m)}\right);$$

and simplify, by using second-order Taylor series expansion, formula (3) to obtain formula (4) of the second score function of the characteristic parameter of the test voice, namely:

$$\text{Score} = \sum_{c=1}^{C}\frac{1}{T}\sum_{t=1}^{T}\frac{p(o_t|s) - p(o_t|m_c)}{\sum_{j=1}^{C}p(o_t|s) + p(o_t|m_j)} = w^t b(\eta), \quad (4)$$

where $w^t$ is a vector whose elements are all 1, namely: $w^t = [1, \ldots, 1]^t$; $b(\eta)$ is a vector of a difference between an average posterior probability of the characteristic parameter of the test voice on the UBM and an average posterior probability of the characteristic parameter of the test voice on the GMM of the target speaker, and may be called a recognition trial information vector, namely: $b(\eta) = [\phi_1, \ldots, \phi_c]^t$, where $$\phi_c = \frac{1}{T}\sum_{t=1}^{T}\frac{p(o_t|s) - p(o_t|m_c)}{\sum_{j=1}^{C}p(o_t|s) + p(o_t|m_j)}. \quad (5)$$

For example, the fourth obtaining unit 24 in this embodiment may be specifically configured to: obtain, by using a recognition trial information vector $b(x_i)$ of a training recognition trial $\{x_i\}$, $i=1, \ldots, N_1$ whose recognition result is determined as true, and a recognition trial information vector $b(y_i)$ of a training recognition trial $\{y_i\}$, $i=1, \ldots, N_2$ whose recognition result is determined as false, and through an SVM, a re-estimated $w^t$, namely:

$$w^t = \left(\sum_{i=1}^{l}\partial_i z_i v_i + D\right)^t, \quad (6)$$

where l is the number of support vectors; $\partial_i$ is −1 or +1, which is determined by a type of a training recognition trial; $z_i$ is a weight of a support vector; $v_i$ is a support vector, and $D=[d, 0, \ldots, 0]^t$; and substitute formula (6) into formula (4) to obtain formula (7) of the third score function of the characteristic parameter of the test voice, namely:

$$\text{Score} = \sum_{c=1}^{C}\frac{1}{T}\sum_{t=1}^{T}\frac{p(o_t|s) - p(o_t|m_c)}{\sum_{j=1}^{C}p(o_t|s) + p(o_t|m_j)} = \quad (7)$$

$$\left(\sum_{i=1}^{l}\partial_i z_i v_i + D\right)^t b(\eta) = \left(\sum_{i=1}^{l}\partial_i z_i v_i\right)^t b(\eta) + d.$$

So far, the characteristic parameter of the test voice may be taken as an input to obtain a corresponding speaker score, so that a recognition result (true or false) can be obtained according to the obtained score.

In this embodiment, identifiability re-estimation is performed on a first vector (namely, a weight vector) in a score function by adopting an SVM and through the fourth obtaining unit, so that a recognition result of a characteristic parameter of a test voice is more accurate, thereby improving identifiability of speaker recognition.

It may be clearly understood by a person skilled in the art that, for the purpose of convenient and brief description, for a detailed working process of the foregoing apparatus and units, reference may be made to the corresponding process in the foregoing method embodiment, and the details are not described herein again.

In the embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and the parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated units may be implemented in a form of hardware, or may also be implemented in a form of hardware plus a software functional unit.

The integrated unit implemented in a form of a software functional unit may be stored in a computer readable storage medium. The software functional unit is stored in a storage medium and includes several instructions for instructing a computer device (which may be a personal computer, a server, or a network device) to perform part of the steps of the methods in the embodiments of the present invention. The foregoing storage medium includes: any medium that can store program codes, such as a universal serial bus (USB) flash disk, a removable hard disk, a read-only memory (ROM), a random access memory (RAM), a magnetic disk, or an optical disc.

Finally, it should be noted that the foregoing embodiments are merely intended for describing the technical solutions of the present invention, other than limiting the present invention. Although the present invention is described in detail with reference to the foregoing embodiments, a person of ordinary skill in the art should understand that he may still make modifications to the technical solutions described in the foregoing embodiments, or make equivalent replacements to some technical features thereof, without departing from the spirit and scope of the technical solutions of the embodiments of the present invention.

What is claimed is:

1. A method for speaker recognition, comprising:
   obtaining a first score function of a characteristic parameter of the test voice by using the characteristic parameter of the test voice, a first Gaussian Mixture Model (GMM), and a second GMM, wherein the first score function is a difference between a logarithm of a first likelihood probability of the characteristic parameter of the test voice on the first GMM and a logarithm of a second likelihood probability of the characteristic parameter of the test voice on the second GMM;
   obtaining a third likelihood probability of the characteristic parameter of the test voice on a third GMM by using the characteristic parameter of the test voice and the third GMM, wherein the third GMM is composed of the first GMM and the second GMM;
   obtaining a second score function of the characteristic parameter of the test voice according to the first score function and the third likelihood probability, wherein the second score function is equal to an inner product of a first vector and a second vector, wherein the first vector is a vector whose elements are all one, and wherein the second vector is a vector of a difference between an average posterior probability of the characteristic parameter of the test voice on the first GMM and an average posterior probability of the characteristic parameter of the test voice on the second GMM;
   re-estimating the first vector by using a vector of a training recognition trial and a support vector machine (SVM) to obtain a third vector and obtain a third score function of the characteristic parameter of the test voice, wherein the third score function is equal to an inner product of the third vector and second vector;
   obtaining a corresponding speaker score by taking the characteristic parameter of the test voice as an input to the third score function; and
   determining a recognition result, wherein the recognition result is true when the corresponding speaker score is higher than a preset threshold value, and wherein the recognition result is false when the corresponding speaker score is lower than the preset threshold value.

2. The method according to claim 1, wherein the first GMM or the second GMM is a Universal Background Model (UBM).

3. The method according to claim 2, wherein the first GMM and the second GMM are, respectively, a UBM and a GMM of a target speaker, wherein the first score function of the characteristic parameter of the test voice is obtained by:

$$\text{Score} = \frac{1}{T}\sum_{t=1}^{T} (\log\, p(o_t\,|\,s) - \log\, p(o_t\,|\,m)), \text{ and} \quad (1)$$

wherein $o_t$ is a characteristic parameter of a test voice, T is a total number of characteristic parameters of test voices, s is the GMM of the target speaker, $p(o_t|s)$ is a likelihood probability of the characteristic parameter of the test voice on the GMM of the target speaker, m is a UBM, and $p(o_t|m)$ is a likelihood probability of the characteristic parameter of the test voice on the UBM.

4. The method according to claim 3, wherein the third GMM is a combined GMM of the target speaker composed of the UBM and the GMM of the target speaker, wherein the third likelihood probability of the characteristic parameter of the test voice on the third GMM is obtained by:

$$p(o_t|\mu) = p(o_t|s)p(s) + p(o_t|m)p(m), \text{ and} \quad (2)$$

wherein $p(o_t|\mu)$ is a likelihood probability of the characteristic parameter of the test voice on the combined GMM of the target speaker.

5. The method according to claim 4, wherein the second score function of the characteristic parameter of the test voice is obtained by:

substituting p(s)=p(m)=0.5 and formula (2) into formula (1) to obtain:

$$\text{Score} = \frac{1}{T}\sum_{t=1}^{T}\left(\log\frac{p(o_t|s)}{p(o_t|\mu)} - \log\frac{p(o_t|m)}{p(o_t|\mu)}\right) = \quad (3)$$

$$\frac{1}{T}\sum_{t=1}^{T}\left(\log\frac{p(o_t|s)}{p(o_t|s)p(s)+p(o_t|m)p(m)} - \log\frac{p(o_t|m)}{p(o_t|s)p(s)+p(o_t|m)p(m)}\right);$$

simplifying formula (3), by using second-order Taylor series expansion to obtain the second score function of the characteristic parameter of the test voice from:

$$\text{Score} = \sum_{c=1}^{C}\frac{1}{T}\sum_{t=1}^{T}\frac{p(o_t|s)-p(o_t|m_c)}{\sum_{j=1}^{C}p(o_t|s)+p(o_t|m_j)} = w^t b(\eta), \quad (4)$$

wherein $w^t$ is a vector whose elements are all one, and $b(\eta)$ is a vector $b(\eta)=[\phi_1,\ldots,\phi_c]^t$ of a difference between an average posterior probability of the characteristic parameter of the test voice on the UBM and an average posterior probability of the characteristic parameter of the test voice on the GMM of the target speaker, and wherein $$\phi_c = \frac{1}{T}\sum_{t=1}^{T}\frac{p(o_t|s)-p(o_t|m_c)}{\sum_{j=1}^{C}p(o_t|s)+p(o_t|m_j)}. \quad (5)$$

6. The method according to claim 5, wherein the vector of the training recognition trial comprises a recognition trial information vector $b(x_i)$ of a training recognition trial $\{x_i\}$, i=1, ..., $N_1$ whose recognition result is determined as true and a recognition trial information vector $b(y_i)$ of a training recognition trial $\{y_i\}$, i=1, ..., $N_2$ whose recognition result is determined as false, wherein the third vector is obtained by:

$$w^t = \left(\sum_{i=1}^{l}\partial_i z_i v_i + D\right)^t, \quad (6)$$

wherein l is the number of support vectors, $\partial_i$ is −1 or +1, which is determined by a type of the training recognition trial, $z_i$ is a weight of a support vector, $v_i$ is a support vector, and $D=[d, 0, \ldots, 0]^t$, wherein the third score function of the characteristic parameter of the test voice is obtained by substituting formula (6) into formula (4) to obtain the third score function of the characteristic parameter of the test voice from:

$$\text{Score} = \sum_{c=1}^{C}\frac{1}{T}\sum_{t=1}^{T}\frac{p(o_t|s)-p(o_t|m_c)}{\sum_{j=1}^{C}p(o_t|s)+p(o_t|m_j)} = \quad (7)$$

$$\left(\sum_{i=1}^{l}\partial_i z_i v_i + D\right)^t b(\eta) = \left(\sum_{i=1}^{l}\partial_i z_i v_i\right)^t b(\eta) + d.$$

7. A device for speaker recognition, comprising:
a first obtaining unit configured to obtain a first score function of a characteristic parameter of a test voice by using the characteristic parameter of a test voice, a first Gaussian Mixture Model (GMM), and a second GMM, wherein the first score function is a logarithm of a first likelihood probability of the characteristic parameter of the test voice on the first GMM and a logarithm of a second likelihood probability of the characteristic parameter of the test voice on the second GMM;
a second obtaining unit configured to obtain a third likelihood probability of the characteristic parameter of the test voice on a third GMM by using the characteristic parameter of the test voice and the third GMM, wherein the third GMM is composed of the first GMM and the second GMM;
a third obtaining unit configured to obtain a second score function of the characteristic parameter of the test voice according to the first score function and the third likelihood probability, wherein the second score function is equal to an inner product of a first vector and a second vector, wherein the first vector is a vector whose elements are all one, and wherein the second vector is a vector of a difference between an average posterior probability of the characteristic parameter of the test voice on the first GMM and an average posterior probability of the characteristic parameter of the test voice on the second GMM;
a fourth obtaining unit configured to re-estimate the first vector by a vector of a training recognition trial and a support vector machine (SVM) to obtain a third vector and obtain a third score function of the characteristic parameter of the test voice, wherein the third score function is equal to an inner product of the third vector and the second vector, wherein the fourth obtaining unit is configured to obtain a corresponding speaker score by taking the characteristic parameter of the test voice as an input to the third score function; and
a determination unit configured to determine a recognition result, wherein the recognition result is true when the corresponding speaker score is higher than a preset threshold value, and wherein the recognition result is false when the corresponding speaker score is lower than the preset threshold value.

8. The device according to claim 7, wherein the first GMM or the second GMM is a Universal Background Model (UBM).

9. The device according to claim 8, wherein the first GMM and the second GMM, respectively, are a UBM and a GMM of a target speaker, wherein the first score function of the characteristic parameter of the test voice is obtained by:

$$\text{Score} = \frac{1}{T}\sum_{t=1}^{T}(\log p(o_t|s) - \log p(o_t|m)), \text{ and} \quad (1)$$

wherein $o_t$ is a characteristic parameter of a test voice, T is a total number of characteristic parameters of test voices, s is the GMM of the target speaker, $p(o_t|s)$ is a likelihood probability of the characteristic parameter of the test voice on the GMM of the target speaker, m is the UBM, and $p(o_t|m)$ is a likelihood probability of the characteristic parameter of the test voice on the UBM.

10. The device according to claim 9, wherein the third GMM is a combined GMM of the target speaker composed of the UBM and the GMM of the target speaker, wherein the third likelihood probability of the characteristic parameter of the test voice on the third GMM is obtained by:

$$p(o_t|\mu) = p(o_t|s)p(s) + p(o_t|m)p(m), \text{ and} \quad (2)$$

wherein $p(o_t|\mu)$ is a likelihood probability of the characteristic parameter of the test voice on the combined GMM of the target speaker.

11. The device according to claim 10, wherein the second score function of the characteristic parameter of the test voice is obtained by substituting $p(s)=p(m)=0.5$ and formula (2) into formula (1) to obtain:

$$\text{Score} = \frac{1}{T}\sum_{t=1}^{T}\left(\log\frac{p(o_t|s)}{p(o_t|\mu)} - \log\frac{p(o_t|m)}{p(o_t|\mu)}\right) = \quad (3)$$

$$\frac{1}{T}\sum_{t=1}^{T}\left(\log\frac{p(o_t|s)}{p(o_t|s)p(s)+p(o_t|m)p(m)} - \log\frac{p(o_t|m)}{p(o_t|s)p(s)+p(o_t|m)p(m)}\right);$$

simplify formula (3) by using second-order Taylor series expansion to obtain the second score function of the characteristic parameter of the test voice from:

$$\text{Score} = \sum_{c=1}^{C}\frac{1}{T}\sum_{t=1}^{T}\frac{p(o_t|s) - p(o_t|m_c)}{\sum_{j=1}^{C}p(o_t|s) + p(o_t|m_j)} = w^t b(\eta), \quad (4)$$

wherein $w^t$ is a vector whose elements are all one, and $b(\eta)$ is a vector $b(\eta)=[\phi_1,\ldots,\phi_c]^t$ of a difference between an average posterior probability of the characteristic parameter of the test voice on the UBM and an average posterior probability of the characteristic parameter of the test voice on the GMM of the target speaker, and wherein $$\phi_c = \frac{1}{T}\sum_{t=1}^{T}\frac{p(o_t|s) - p(o_t|m_c)}{\sum_{j=1}^{C}p(o_t|s) + p(o_t|m_j)}. \quad (5)$$

12. The device according to claim 11, wherein the vector of a training recognition trial comprises a recognition trial information vector $b(x_i)$ of a training recognition trial $\{x_i\}$, i=1,..., $N_1$ whose recognition result is determined as true and a recognition trial information vector $b(y_i)$ of a training recognition trial $\{y_i\}$, i=1,..., $N_2$ whose recognition result is determined as false, wherein the third vector is obtained by:

$$w^t = \left(\sum_{i=1}^{l}\partial_i z_i v_i + D\right)^t, \quad (6)$$

wherein l is the number of support vectors, $\partial_l$ is −1 or +1, which is determined by a type of the training recognition trial, $z_l$ is a weight of a support vector, $v_l$ is a support vector, and $D=[d, 0, \ldots, 0]^l$, wherein the third score function of the characteristic parameter of the test voice is obtained by substituting formula (6) into formula (4) to obtain the third score function of the characteristic parameter of the test voice from:

$$\text{Score} = \sum_{c=1}^{C}\frac{1}{T}\sum_{t=1}^{T}\frac{p(o_t|s) - p(o_t|m_c)}{\sum_{j=1}^{C}p(o_t|s) + p(o_t|m_j)} = \quad (7)$$

$$\left(\sum_{i=1}^{l}\partial_i z_i v_i + D\right)^t b(\eta) = \left(\sum_{i=1}^{l}\partial_i z_i v_i\right)^t b(\eta) + d.$$

13. A device for speaker recognition, comprising:
a memory for storing computer executable instructions; and
a processor configured to execute the computer executable instructions to:
obtain a first score function of a characteristic parameter of a test voice by using the characteristic parameter of the test voice, a first Gaussian Mixture Model (GMM), and a second GMM, wherein the first score function is a logarithm of a first likelihood probability of the characteristic parameter of the test voice on the first GMM and a logarithm of a second likelihood probability of the characteristic parameter of the test voice on the second GMM;
obtain a third likelihood probability of the characteristic parameter of the test voice on a third GMM by using the characteristic parameter of the test voice and the third GMM, wherein the third GMM is composed of the first GMM and the second GMM;
obtain a second score function of the characteristic parameter of the test voice according to the first score function and the third likelihood probability, wherein the second score function is equal to an inner product of a first vector and a second vector, wherein the first vector is a vector whose elements are all one, and wherein the second vector is a vector of a difference between an average posterior probability of the characteristic parameter of the test voice on the first GMM and an average posterior probability of the characteristic parameter of the test voice on the second GMM;
re-estimate the first vector by using a vector of a training recognition trial and a support vector machine (SVM) to obtain a third vector and obtain a third score function of the characteristic parameter of the test voice, wherein the third score function is equal to an inner product of the third vector and the second vector;
obtain a corresponding speaker score by taking the characteristic parameter of the test voice as an input to the third score function; and
determine a recognition result, wherein the recognition result is true when the corresponding speaker score is higher than a preset threshold value, and wherein the recognition result is false when the corresponding speaker score is lower than the preset threshold value.

14. The device according to claim 13, wherein the first GMM or the second GMM is a Universal Background Model (UBM).

15. The device according to claim 14, wherein the first GMM and the second GMM, respectively, are a UBM and a GMM of a target speaker, wherein the first score function of the characteristic parameter of the test voice is obtained by:

$$\text{Score} = \frac{1}{T}\sum_{t=1}^{T}(\log p(o_t|s) - \log p(o_t|m)), \text{ and} \quad (1)$$

wherein $o_t$ is a characteristic parameter of a test voice, T is a total number of characteristic parameters of test voices, s is the GMM of the target speaker, $p(o_t|s)$ is a likelihood probability of the characteristic parameter of the test voice on the GMM of the target speaker, m is a UBM, and $p(o_t|m)$ is a likelihood probability of the characteristic parameter of the test voice on the UBM.

16. The device according to claim 15, wherein the third GMM is a combined GMM of the target speaker composed of the UBM and the GMM of the target speaker, wherein the third likelihood probability of the characteristic parameter of the test voice on the third GMM is obtained by:

$$p(o_t|\mu) = p(o_t|s)p(s) + p(o_t|m)p(m), \text{ and} \quad (2)$$

wherein $p(o_t|\mu)$ is a likelihood probability of the characteristic parameter of the test voice on the combined GMM of the target speaker.

17. The device according to claim 16, wherein the second score function of the characteristic parameter of the test voice is obtained by:

substituting $p(s)=p(m)=0.5$ and the formula (2) into formula (1) to obtain:

$$\text{Score} = \frac{1}{T}\sum_{t=1}^{T}\left(\log\frac{p(o_t|s)}{p(o_t|\mu)} - \log\frac{p(o_t|m)}{p(o_t|\mu)}\right) = \quad (3)$$

$$\frac{1}{T}\sum_{t=1}^{T}\left(\log\frac{p(o_t|s)}{p(o_t|s)p(s) + p(o_t|m)p(m)} - \log\frac{p(o_t|m)}{p(o_t|s)p(s) + p(o_t|m)p(m)}\right);$$

simplifying formula (3) by using second-order Taylor series expansion to obtain the second score function of the characteristic parameter of the test voice from:

$$\text{Score} = \sum_{c=1}^{C}\frac{1}{T}\sum_{t=1}^{T}\frac{p(o_t|s) - p(o_t|m_c)}{\sum_{j=1}^{C}p(o_t|s) + p(o_t|m_j)} = w^t b(\eta), \quad (4)$$

wherein $w^t$ is a vector whose elements are all one, and $b(\eta)$ is a vector $b(\eta)=[\phi_1,\ldots,\phi_c]^t$ of a difference between an average posterior probability of the characteristic parameter of the test voice on the UBM and an average posterior probability of the characteristic parameter of the test voice on the GMM of the target speaker, and wherein $$\phi_c = \frac{1}{T}\sum_{t=1}^{T}\frac{p(o_t|s) - p(o_t|m_c)}{\sum_{j=1}^{C}p(o_t|s) + p(o_t|m_j)}. \quad (5)$$

18. The device according to claim 17, wherein the vector of a training recognition trial comprises a recognition trial information vector $b(x_i)$ of a training recognition trial $\{x_i\}$, i= 1, ..., $N_1$ whose recognition result is determined as true and a recognition trial information vector $b(y_i)$ of a training recognition trial $\{y_i\}$, i=1, ..., $N_2$ whose recognition result is determined as false, wherein the third vector is obtained by:

$$w^t = \left(\sum_{i=1}^{l}\partial_i z_i v_i + D\right)^t, \quad (6)$$

wherein l is the number of support vectors, $\partial_l$ is −1 or +1, which is determined by a type of the training recognition trial, $z_l$ is a weight of a support vector, $v_l$ is a support vector, and $D=[d, 0, \ldots, 0]^t$, wherein the third score function of the characteristic parameter of the test voice is obtained by substituting formula (6) into formula (4) to obtain the third score function of the characteristic parameter of the test voice from:

$$\text{Score} = \sum_{c=1}^{C}\frac{1}{T}\sum_{t=1}^{T}\frac{p(o_t|s) - p(o_t|m_c)}{\sum_{j=1}^{C}p(o_t|s) + p(o_t|m_j)} = \quad (7)$$

$$\left(\sum_{i=1}^{l}\partial_i z_i v_i + D\right)^t b(\eta) = \left(\sum_{i=1}^{l}\partial_i z_i v_i\right)^t b(\eta) + d.$$

* * * * *